3,023,132
METHOD OF SOFTENING WATER AND WASHING ARTICLES
William J. Diamond, Muskegon, Mich., Harry Levin, Woodland Hills, Calif., and Donald C. Wood, St. Joseph, Mich., assignors to Whirlpool Corporation, a corporation of Delaware
Filed Sept. 14, 1959, Ser. No. 839,944
7 Claims. (Cl. 134—10)

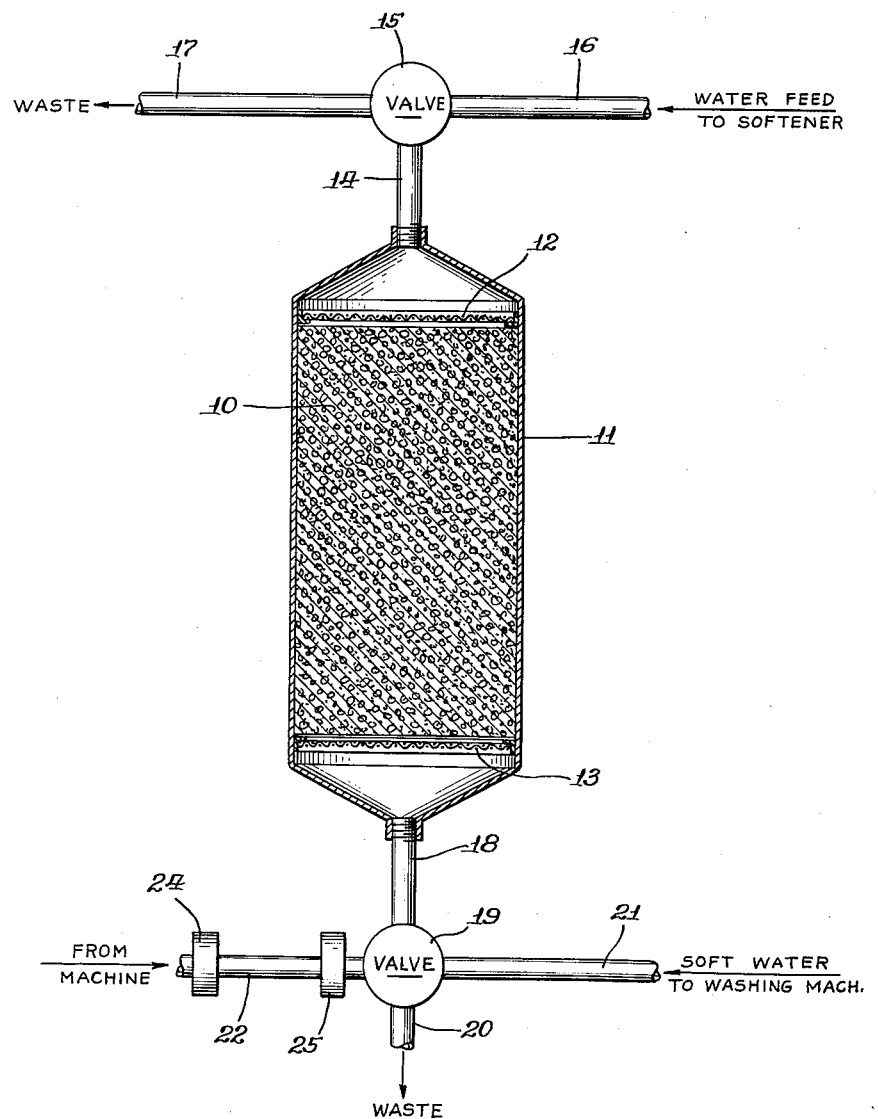

This invention relates to a method of softening water and washing articles.

Because practically all of the available raw water used in washing soiled articles is hard water to varying degrees, it has been customary to provide water softening facilities for softening this water so as to improve the efficiency of the washing operation. A common way of accomplishing this water softening is to use a base exchange material such as natural or artificial zeolite or base exchange resins. Raw water fed through a bed of granular material of this type softens the water by an ion exchange operation. When the material has become exhausted, it is then necessary to flow a regenerating salt solution of ordinary sodium chloride through the bed until the bed is regenerated.

In the present invention the water softening material bed is used to soften raw water in the customary manner. Then a washing composition containing an alkali metal salt is added to the softened water to form a washing solution. The washing solution is then passed through the bed for regenerating the material. A washing composition containing the alkali metal salt is one of course that will not form harmful amounts of precipitates. This is desirable to insure an efficient washing action and also to prevent plugging of the bed of base exchange material.

One of the features of this invention therefore is to provide an improved method of softening water in the washing of soiled articles comprising flowing raw water through a bed of base exchange water softening material for softening the water, adding a washing composition containing an alkali metal salt to said water subsequent to its passage through said bed to form a washing solution and flowing said washing solution through said bed for regenerating the material.

Another feature of the invention is to provide such a method comprising flowing raw water through a bed of base exchange water softening material for softening the water, conveying said softened water to a place of washing articles, adding a washing composition containing an alkali metal salt to said water subsequent to its passage through said bed to form a washing solution, washing said articles at said place to produce used wash water, and flowing said used wash water from said place through said bed for regenerating the material.

Other features of the invention will be apparent from the following description of certain embodiments of the invention taken in conjunction with the accompanying drawing.

The single figure of the drawing is a semi-diagrammatic sectional view of one embodiment of an apparatus for practicing the invention.

In the illustrated apparatus a body 10 of base exchange water softening material is contained within a cylindrical casing 11. This casing 11 is arranged substantially vertically and is provided at its top with a material retaining screen 12 and at its bottom with a similar retaining screen 13. The material of the bed 10, preferably an ion exchange resin, is in the customary granular form and is retained in position by the screens 12 and 13.

The top of the casing 11 is connected by means of a pipe 14 to a three-way valve 15, one side of the valve is connected by means of a pipe 16 to a source of raw water feed while another side of the valve is connected by a pipe 17 to the sewer or other waste disposal means.

The other end of the casing 11 is connected by means of a pipe 18 to a four-way valve. One side of this valve is connected by means of a pipe 20 to the sewer or the like, while another side of the valve is connected by means of a pipe 21 to a place of washing articles (not shown) such as an ordinary clothes washing machine. This pipe 21 may be used to convey water both to and from the machine but in the illustrative installation another pipe 22 will be used to convey used wash water from the machine. This pipe may contain an ordinary lint filter as illustrated diagrammatically at 24.

In a particular embodiment the casing 11 and associated structure may be mounted on or in conjunction with a clothes washing machine, dish washing machine or the like where any type of washing operation is to be performed. If the machine is an automatic machine the apparatus may be placed in the circuit of water to and from the machine.

In operation raw water is fed into the washing machine, for example a clothes washing machine, by flow through the pipe 16, valve 15 and pipe 14 into and downwardly through the bed 10 of water softening material. While flowing through the bed 10 the raw water is softened and this softened water is directed by means of the pipe 18, valve 19 and pipe 21 into the washing machine. At a point subsequent to the bed 10, such as by adding directly to the water in the washing machine, a washing composition containing an alkali metal salt such as a phosphate is added manually or by means of an automatic dispensing device incorporated in the machine. The washing operation is then performed in the customary manner. At the conclusion of the washing operation the used wash water is then conveyed from the machine through the pipe 22, valve 19 and pipe 18 into and upwardly through the bed 10 of water softening material. From the bed 10 the used wash water flows through the pipe 14, valve 15 and pipe 17 to the sewer or other place of disposal.

In the above flow of used wash water the screen 13 serves to remove solids from the used wash water. In its passage through the bed 10 the alkali metal salt in the used washing solution regenerates the water softening material of the bed 10 so as to prepare it for softening the raw feed water in the next operation of the washing machine.

If desired, solids may be flushed from the bed 10 and screen 13 by flowing a small amount of water through the pipe 16 and pipe 14 down through the bed 10, through the screen 13, pipe 18, valve 19 and pipe 20 into the sewer or other waste disposal.

The washing composition that is used in the method of this invention is one containing a surface active agent such as a soap or synthetic detergent and containing also the alkali metal salt which is preferably a salt that itself contributes to the cleansing operation of the washing composition. Typical salts of this type are the alkali metal and preferably the sodium and potassium salts such as the phosphates. As is customary, the salt chosen is one that will not produce an excess amount of precipitate and thus is preferably not an alkali metal pyrophosphate. The preferred salt is an alkali metal salt of orthophosphoric acid or metaphosphoric acid. These salts are well known and widely used in washing compositions for modifying the resulting washing solution and thereby contributing to the satisfactory performance of the washing solution.

In practicing the method of this invention the preferred washing composition that is added to the water is one containing between 40–60% by weight of the composition of the specified salt of the alkali metal phosphate or mixture of phosphates. The washing composition is used in the water in an amount preferably between 0.2–0.4% by weight of the water. The washing composition may also contain, if desired, a bactericide in order to prevent bacterial growth in the bed 10 or the water may be passed through a bactericide body as illustrated diagrammatically at 25. Other well known ways may, of course, be used to keep down or prevent this bacterial growth. The washing solution in the washing machine preferably contains at least 60 grams of total phosphate for each 17 gallons of water in the machine. This will insure not only efficient washing but will also supply sufficient phosphate to regenerate the base exchange material.

Where the exchange material is an ion exchange resin, preferably in bead form, the phosphate anion from the tripolyphosphate or hexametaphosphate will chelate the calcium from the resin bead leaving the sodium or potassium cation to take the place of the calcium that has been taken off the bead. The reaction is only a surface action and does not penetrate the interstices of the resin bead because the phosphate ion is too big to diffuse through the resin bead. It is, therefore, necessary to have sufficient external surface area on the resin beads in order to take care of the amount of calcium ion to be removed from the incoming hard water.

The water softening method of this invention is particularly applicable to home washing machines, dish washing machines and the like. Thus the apparatus including the casing 11 and the necessary valves may be mounted on the back of the machine. In one typical installation the casing 11 was only four inches in diameter and eleven inches long and contained between 1500 and 2000 grams of wet base exchange water softening material. These materials are in granular form and are well known and widely used for softening water. Thus they may be a sodium-calcium exchange resin of which the Rohm and Haas cationic exchange resin IR–120 is a good example.

In the method of this invention there is no requirement for separate sodium chloride solution for regenerating the base exchange material as is true with prior regenerating methods. The alkali metal salt preferably is one which itself contributes to the operation of the washing composition containing the surface active agent and thus the base exchange material is automatically regenerated each time the washing operation is performed. This, of course, does not preclude using sodium chloride solution periodically, if desired, in order to insure that the base exchange material is performing with peak efficiency at all times.

As can be seen the method of this invention has a number of important advantages. Thus the water softener is kept quite small and need have only the dimensions recited above where 17–18 gallons of water is used in the washing operation. Where greater or smaller amounts of water are used in a particular washing operation, the base exchange material bed may of course be correspondingly larger or smaller. A particularly important advantage of the invention is that the base exchange material is regenerated after each washing operation by using only the waste wash water in the regeneration and without requiring separate flow of the ordinary sodium chloride solution.

Although only screens 12 and 13 have been shown in the illustrated apparatus this is only a semi-diagrammatic showing and other types of supports and auxiliary supports such as diffuser plates or the like may be used if desired.

*Example 1*

One example of a washing composition that may be used with this invention is one having the following composition:

| | Percent |
|---|---|
| Anionic or non-ionic organic detergent | 15–25 |
| Sodium salts of hexametaphosphate or tripolyphosphate or tetraphosphate (all free of pyrophosphates) | 45–60 |
| Silicates (approximately meta) | 8–12 |
| Sodium carboxymethylcellulose, optical bleach, filler, and/or other constituents | 3–32 |

*Example 2*

A specific example of such a composition is the following:

| | Percent |
|---|---|
| Non-ionic organic detergent (Sterox CD, Monsanto Chemical Co.), a polyoxyethylene ester | 20 |
| Sodium tripolyphosphate | 50 |
| Sodium metasilicate | 12 |
| Sodium carboxymethyl cellulose (Carbose D, Wyandotte Chemical Co.) | 1 |
| Sodium sulfate | 17 |

The pH of a 0.2% solution is 10.7 at 25° C. When added to 17 gallons of softened water to make a 0.15% solution, this detergent satisfactorily and repeatedly removed 255 grains of calcium as calcium carbonate from an ion exchange column using IR–120 resin, a product of Rohm and Haas Co. Sixty cycles were run. At the end of this experiment the calcium content was 21.7% of the exchange capacity of the resin. There was no evidence of increased column pressure drop or clogging.

All percentages given throughout this application are by weight.

*Example 3*

Another example of a washing composition for use in the method of this invention is one having the following formula:

| | Percent |
|---|---|
| Non-ionic surface active agent, a ditertiary acetylenic glycol with a melting point of 37° C. and boiling point of 260° C. | 5 |

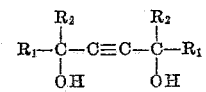

wherein $R_1$ and $R_2$ are alkyl or aryl.

| | Percent |
|---|---|
| Non-ionic surface active agent, a polyproylene glycol ethylene oxide condensate with an approximate molecular weight of 3000, viscosity at 25° C. of 500–700, made by sodium catalyst reaction | 15 |
| Sodium tripolyphosphate | 62 |
| Sodium carboxymethyl cellulose, low viscosity | 2 |
| Sodium metasilicate | 16 |

*Example 4*

Another example of a washing composition is as follows:

| | Percent |
|---|---|
| Sodium-N-cyclohexyl-N-palmitoyltaurate $(CH_3(CH_2)_{14}CONC_6H_{11}(CH_2)_2SO_3Na)$ | 8 |
| Sodium carboxymethyl cellulose | 2 |
| Sodium tripolyphosphate | 60 |
| Sodium metasilicate | 14 |
| Alkyl phenoxy polyoxyethylene ethanol | 6 |

Example 5

Another example of such a washing composition is as follows:

| | Percent |
|---|---|
| Sodium tripolyphosphate | 60 |
| Sodium metasilicate | 12 |
| Carboxymethyl cellulose | 1.5 |
| Non-ionic alkyl aryl polyether | 10 |
| Urea | 15.5 |
| Di-isobutyl-cresoxy-ethoxy-ethyl-dimethyl benzyl ammonium chloride | 2 |

The above formulation incorporating a high tripolyphosphate content with an added bactericide-fungicide prevents undesirable growth in a small washing machine water softener and also acts as the regenerative solution.

The di-isobutyl-cresoxy-ethoxy-ethyl-dimethyl benzyl ammonium chloride acts as a bactericide and fungicide in water solution at high dilution.

Having described our invention as related to the embodiments set out herein and shown in the accompanying drawing, it is our intention that the invention be not limited by any of the details of description, unless otherwise specified, but rather be construed broadly within its spirit and scope as set out in the accompanying claims.

The embodiments of the invention in which an exclusive property or privilege is claimed are defined as follows:

1. The method of washing soiled articles and softening water, comprising: flowing raw water through a bed of base exchange water softening material for softening the water; adding a washing composition containing a member of the class consisting of alkali metal chlorides and alkali metal phosphates to said water subsequent to its passage through said bed to form a washing solution; utilizing said washing solution in a cleansing action and subsequently flowing at least a portion of said washing solution through said bed for regenerating the material.

2. The method of claim 1 wherein said salt is one contributing to the cleansing action of the washing composition.

3. The method of washing soiled articles and softening water, comprising: flowing raw water through a bed of base exchange water softening material for softening the water; conveying said softened water to a place of washing articles; adding a washing composition containing a member of the class consisting of alkali metal chlorides and alkali metal phosphates to said water subsequent to its passage through said bed to form a washing solution; washing said articles at said place with said washing solution to produce used wash water; and flowing said used wash water from said place through said bed for regenerating the material.

4. The method of washing soiled articles and softening water, comprising: flowing raw water through a bed of base exchange water softening material for softening the water; conveying said softened water to a place of washing articles; adding a washing composition containing an alkali metal phosphate to said water subsequent to its passage through said bed to form a washing solution; washing said articles at said place with said washing solution to produce used wash water; and flowing said used wash water from said place through said bed for regenerating the material.

5. The method of washing soiled articles and softening water, comprising: flowing raw water through a bed of base exchange water softening material for softening the water; conveying said softened water to a place of washing articles; adding a washing composition containing an alkali metal salt of a member of the class consisting of orthophosphoric acids and metaphosphoric acids to said water subsequent to its passage through said bed to form a washing solution; washing said articles at said place with said washing solution to produce used wash water; and flowing said used wash water from said place through said bed for regenerating the material.

6. The method of washing soiled articles and softening water, comprising: flowing raw water through a bed of base exchange water softening material for softening the water; conveying said softened water to a place of washing articles; adding a washing composition containing sodium tripolyphosphate to said water subsequent to its passage through said bed to form a washing solution; washing said articles at said place with said washing solution to produce used wash water; and flowing said used wash water from said place through said bed for regenerating the material.

7. The method of washing soiled articles and softening water, comprising: flowing raw water through a bed of base exchange water softening material for softening the water; conveying said softened water to a place of washing articles; adding a washing composition containing sodium hexametaphosphate to said water subsequent to its passage through said bed to form a washing solution; washing said articles at said place with said washing solution to produce used wash water; and flowing said used wash water from said place through said bed for regenerating the material.

References Cited in the file of this patent

UNITED STATES PATENTS

| 1,947,248 | Burks | Feb. 13, 1934 |
| 2,292,814 | Bariffi | Aug. 11, 1942 |
| 2,776,258 | Gilliland | Jan. 1, 1957 |